(12) United States Patent
Bourget (10) Patent No.: US 7,905,611 B1
(45) Date of Patent: Mar. 15, 2011

(54) VEHICLE HAVING UNDERSIDE REFLECTOR

(76) Inventor: Anthony J. Bourget, Eau Claire, WI (US)

( * ) Notice: Subject to any disclaimer, the term of this patent is extended or adjusted under 35 U.S.C. 154(b) by 961 days.

(21) Appl. No.: 11/379,054

(22) Filed: Apr. 17, 2006

(51) Int. Cl.
  *G02B 5/124* (2006.01)
(52) U.S. Cl. .......... 359/533; 359/530; 359/536; 359/548
(58) Field of Classification Search .................. 359/520, 359/533, 548–550
See application file for complete search history.

(56) References Cited

U.S. PATENT DOCUMENTS

| | | | |
|---|---|---|---|
| 2,163,380 A | 6/1939 | Malaguti | |
| 4,299,442 A | 11/1981 | Buckelew | |
| 5,210,642 A | 5/1993 | Coligionis | |
| 5,402,266 A | 3/1995 | Coligionis | |
| 5,430,625 A | 7/1995 | Abarr et al. | |
| 5,682,138 A | 10/1997 | Powell et al. | |
| 5,709,455 A | 1/1998 | Danekas et al. | |
| 6,942,350 B2 * | 9/2005 | Mimura et al. | 359/530 |
| 7,011,418 B2 | 3/2006 | Adams | |

OTHER PUBLICATIONS

Nat'l Highway Traffic Safety Admin., DOT, 49 C.F.R. 571.108, (Oct. 1, 2004 Edition), p. 239-313, Office of the Federal Register National Articles and Records Administration, USA.

* cited by examiner

*Primary Examiner* — James Phan
(74) *Attorney, Agent, or Firm* — Anthony J. Bourget (57) ABSTRACT

A vehicle for travel on a roadway comprising a vehicle and at least one retroreflector affixed to the vehicle, at least a portion of the retroreflector having a substantially planar, substantially transparent exterior surface, the substantially planar exterior surface aligned substantially parallel to the roadway. The retroreflector is preferably mounted to an underside of the vehicle to retroreflect light from oncoming vehicles when the vehicle has tipped on a side so that an underside portion of the vehicle may be seen by an observer in the oncoming vehicle.

20 Claims, 6 Drawing Sheets

VEHICLE HAVING UNDERSIDE REFLECTOR

BACKGROUND OF THE INVENTION

1. Field of the Invention

The present invention relates generally to vehicles and trailers, and more specifically to vehicles and trailers that travel on a roadway and which are equipped with reflective materials.

2. Background Information

Many countries require vehicles which are used on public roads and thoroughfares to be equipped with light reflectors. In the United States, for instance, the federal government requires vehicles to be equipped with lamps and reflective devices. Elaborate regulations are in place with the goal of crash avoidance. Typically the lights and/or reflectors are positioned on a vehicle to alert oncoming traffic of the presence of the vehicle for safety purposes. These lights and/or reflectors are positioned at various points around the vehicle, such as on either side of the vehicle and/or at the front or rear portions of the vehicle.

The reflectors generally work fine for situations where a vehicle is stopped or stalled on a roadway or side of the roadway, for instance. The headlights of an oncoming vehicle generally cast light off the reflectors which reflects back to the oncoming vehicle. However, a stalled vehicle may not always be positioned upright to allow for reflection. While reflectors may be positioned around the circumference of the stalled vehicle, the bottom of the vehicle may be all that is showing to an oncoming vehicle. Such is the case, for instance, in recent tragic events involving an overturned tractor trailer or semi-trailer vehicle having jackknifed on a highway late at night. Oncoming traffic is unable to see the overturned vehicle or trailer until in close proximity. If the oncoming vehicle is traveling at night and at high speed, a collision is not unexpected. The collision can be tragic. Fortunately, such tragedies can be minimized or avoided altogether with the use of reflective material positioned on the underside (and/or topside) of the stalled vehicle. Thus, even if a vehicle flips over with only a bottom portion visible to oncoming traffic, an oncoming driver may still be alerted of the situation in time to take corrective action. With minimal expense of applying a cautionary device to the underside of vehicles, greater safety can be achieved on our roadways.

All types of vehicles can and should be equipped with such reflectors, including the tractor-trailer example noted above, and automobiles, and busses, and every other type of vehicle or trailer on the roadway. Rescue or recovery workers will also find the invention useful in cases where the vehicles have flipped over, especially at night, or where vehicles are submerged in water or other situations causing difficulty in spotting the vehicle. Being able to span a flashlight across a potential crash site or location to observe a reflection from the invention will allow the quick location of distressed vehicles and faster rescue or recovery of the occupants or the vehicle itself.

There are numerous examples of reflective devices being applied to vehicles. Some inventions for which patents have been granted are found in the following: Coligionis, U.S. Pat. No. 5,210,642; Coligionis, U.S. Pat. No. 5,402,266; Adams, U.S. Pat. No. 7,011,418; Danekas et al., U.S. Pat. No. 5,709,455; Malaguti, U.S. Pat. No. 2,163,380; among perhaps many more.

None of these prior devices, or prior inventions for which patents have been granted, however, include a retroreflective device viewable from the underside of a vehicle, or even recognize that there would be use for such an invention. Further, none of these prior devices include a retroreflector oriented to reflect light away from the vehicle at an angle generally perpendicular to an underside of the vehicle.

The term "retroreflective" as used herein refers to the attribute of reflecting an obliquely incident light ray in a direction antiparallel to its incident direction, or nearly so, such that it returns to the light source or the immediate vicinity thereof. There are three types of reflection. Every surface is a reflector. If light hits a sheet of paper, it is reflected in all directions. This is diffuse reflection. With a mirror, the light reflects from the surface at the same angle (angle of incidence equals the angle of reflection). This is specular reflection. With a retroreflector, light is reflected back in the direction that it came from.

Some vehicles, including tractor-trailers, are subject to numerous laws and regulations in an effort to increase the safety of highway traffic. One example of a regulation that attempts to increase highway safety is 49 C.F.R. Section 571.108 ("the Regulation"). One stated purpose of the Regulation is to enhance the conspicuity of motor vehicles on the public roads so that their presence is perceived and their signals understood, both in daylight and darkness.

One of the requirements of the Regulation pertains to tractor-trailers, and requires the trailers to have retroreflective sheeting, reflex reflectors, or a combination thereof, along, for example, the sides of the trailers. Retroreflective sheeting must consist of a smooth, flat, transparent exterior film with retroreflective elements embedded or suspended beneath the film so as to form a non-exposed retroreflective optical system. Retroreflective sheeting must comply with ASTM D4956 standards, except for photometric requirements, which can be found in FIG. 29 of the Regulation. Numerous types of retroreflective sheeting and reflex reflectors are available to satisfy the Regulation. Applicant is aware of no requirement for use of retroreflective sheeting, reflex reflectors, or a combination thereof, at the underside or topside of the trailers (or any vehicles).

SUMMARY OF THE INVENTION

The present invention is directed toward fulfilling safety needs and includes a vehicle for travel on a roadway comprising a vehicle and at least one retroreflector affixed to the vehicle, at least a portion of the retroreflector having a substantially planar, substantially transparent exterior surface, the substantially planar exterior surface aligned substantially parallel to the roadway.

A further aspect of the invention includes a vehicle for travel on a roadway comprising a vehicle having at least two wheels defining a bottom plane where the wheels contact the roadway; and at least one retroreflector affixed to the vehicle, at least a portion of the retroreflector having a substantially planar, substantially transparent exterior surface, the substantially planar exterior surface aligned substantially parallel to the bottom plane.

A further aspect of the invention includes a vehicle for travel on a roadway comprising a vehicle having a side and at least one retroreflector affixed to the vehicle, at least a portion of the retroreflector having a substantially planar, transparent exterior surface, the substantially planar exterior surface aligned substantially perpendicular to the roadway when the vehicle lies on the side.

Yet a further aspect of the invention includes a method for enhancing the visibility of a vehicle, the method comprising providing a vehicle, affixing at least one retroreflector to the vehicle, and orienting the retroreflector to reflect incident light away from the vehicle at an angle generally perpendicular to an underside of the vehicle.

The above summary of the present invention is not intended to describe each illustrated embodiment, aspect, or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention and as defined by the appended claims.

DETAILED DESCRIPTION OF THE INVENTION

The present invention is directed to a vehicle that includes retroreflective material oriented to reflect incident light away from the vehicle at an angle generally perpendicular to an underside of the vehicle. The invention is particularly useful for improving the conspicuity of vehicles that have overturned in the roadway such that an underside is facing the oncoming traffic. A retroreflector is affixed to the vehicle such that light is reflected toward oncoming traffic. One aspect includes a vehicle for travel on a roadway comprising a vehicle and at least one retroreflector affixed to the vehicle, at least a portion of the retroreflector having a substantially planar, substantially transparent exterior surface, the substantially planar exterior surface aligned substantially parallel to the roadway and/or substantially parallel to an underside of the vehicle.

Figure 1:
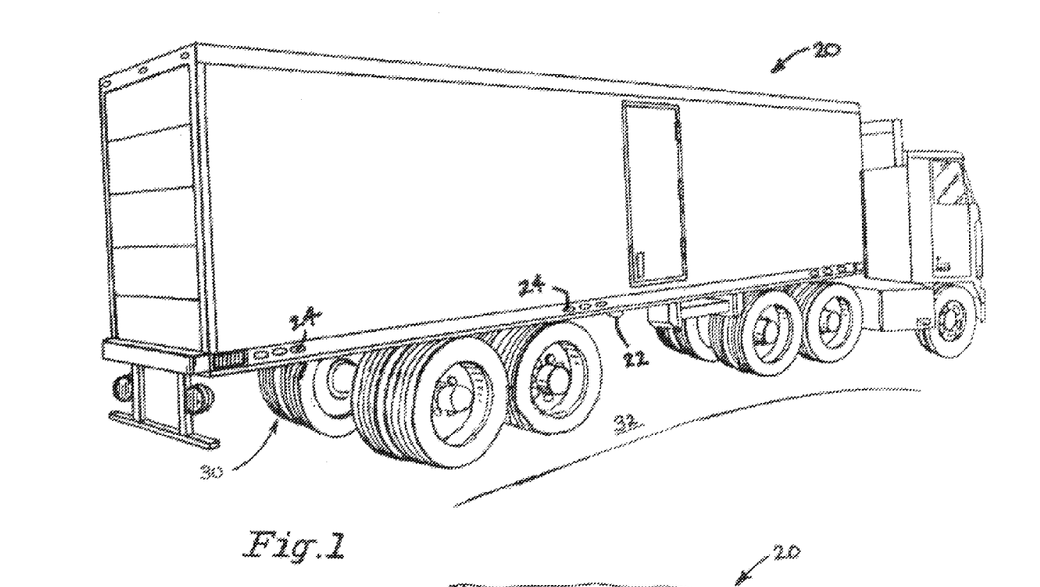
FIG. 1 is a perspective view of an exemplary vehicle of the present invention.

Referring to FIG. 1, a vehicle according to the present invention is generally depicted with reference to numeral 20. Vehicle 20 may include one of several different varieties of vehicles, including but not limited to a tractor-trailer as generally shown in FIG. 1, a tractor-trailer, tractor, trailer, truck, bus, automobile, dump truck, van, delivery vehicle, box trailer, flatbed trailer, tanker, and the like. Vehicles include trailers which are themselves attached to other vehicles to travel about a roadway.

In one aspect, vehicle 20 includes a vehicle and at least one retroreflector 22 affixed to vehicle 20. Retroreflector 22 includes retroreflective material or elements, and may include retroreflectors as are generally known to those skilled in the art. Examples of some retroreflectors include a corner cube reflector, a cube corner element, a cat's-eye reflector, a retroreflective tape, a retroreflective strip, a retroreflective sheeting, microsphere-based sheeting, cube corner sheeting, a microsphere bead, a retroreflective paint, a retroreflective paste, a retroreflective glass bead, a retroreflective ceramic bead, and a molded plastic retroreflector containing multiple cube corner elements. Retroreflectors are known and are commonly used on vehicles of many varieties and are placed on various locations of vehicles for the stated purpose of enhancing safety of the vehicle. Preferably, retroreflector 22 complies with ASTM D4956 standards for retroreflective sheeting and preferably retroreflector 22 conforms to SAE Standard J594f, Reflex Reflectors, January 1977. Preferably retroreflector 22 is securely mounted on a rigid part of the vehicle other than glazing that is not designed to be removed except for repair. A typical tractor-trailer vehicle 20 is already equipped with side reflectors 24 (which may also be retroreflectors in compliance with the Regulations and standards as mentioned herein).

Figure 4:
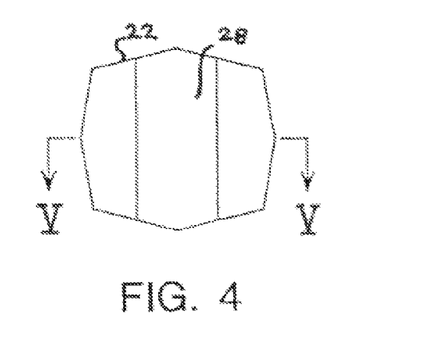
FIG. 4 is a plan view of a further aspect of the present invention.
Figure 5:
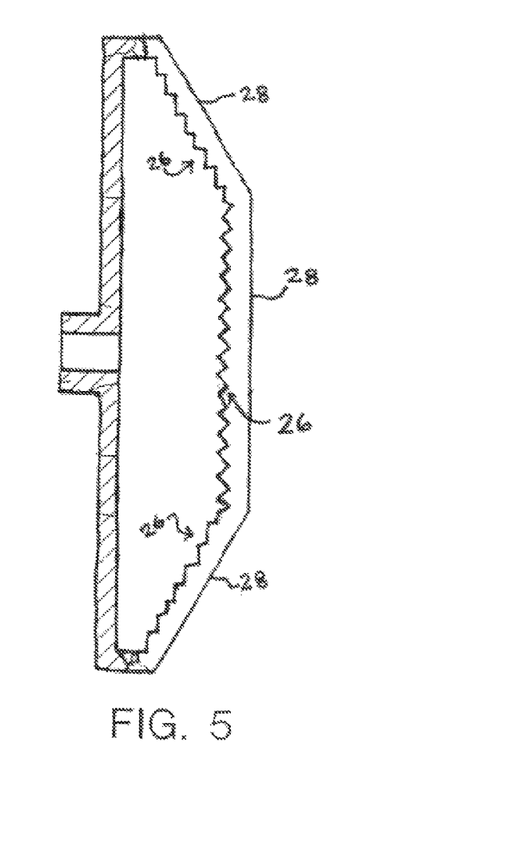
FIG. 5 is a section view taken along line V-V of FIG. 4.

One exemplary retroreflector 22 is presented with reference to FIG. 4 and FIG. 5. At least a portion of retroreflector 22 includes a substantially planar, substantially transparent exterior surface 28. Retroreflector 22 is affixed to vehicle 20 such that exterior surface 28 is aligned substantially parallel to the underside of vehicle 20. It may be appreciated that retroreflector 22 is affixed to vehicle 20 such that exterior surface 28 is also aligned substantially parallel to the roadway upon which vehicle 20 is positioned. Contained within retroreflector 22 of FIG. 5 are retroreflective elements 26. Retroreflective elements 26 are generally aligned opposite exterior surface 28 as shown. Retroreflective elements 26 are embedded or suspended behind surface 28 to form a non-exposed retroreflective optical system. It may be appreciated that the particular pattern design of elements 26 may vary greatly depending upon the desired application while still maintaining the retroreflective features of the retroreflector.

Figure 3:
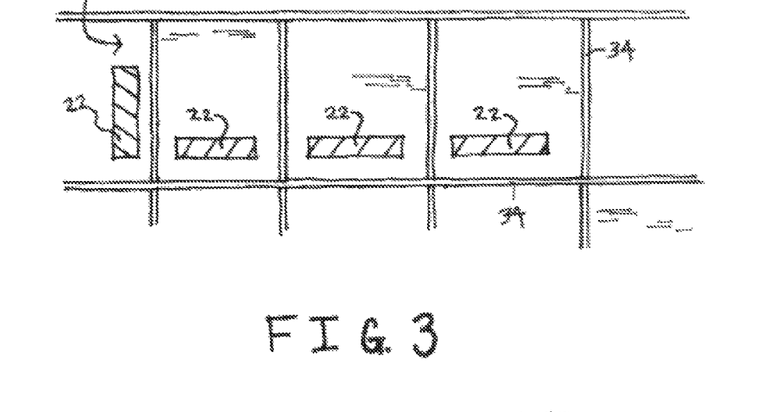
FIG. 3 is a partial bottom view of a further aspect of the present invention.

Retroreflector 22 may also include retroreflective sheeting 22 as shown generally in FIG. 3. Two known types of retroreflective sheeting are microsphere-based sheeting and cube corner sheeting. Microsphere-based sheeting, sometimes called "beaded" sheeting, employs a multitude of microspheres typically at least partially imbedded in a binder layer and having associated specular or diffuse reflecting materials (e.g., pigment particles, metal flakes, vapor coats) to retroreflect incident light. Illustrative examples are disclosed in U.S. Pat. Nos. 3,190,178 (McKenzie), 4,025,159 (McGrath), and 5,066,098 (Kult). Cube corner retroreflective sheeting comprises a body portion typically having a substantially planar front surface and a structured rear surface comprising a plurality of cube corner elements. Each cube corner element comprises three approximately mutually perpendicular optical faces. Examples include U.S. Pat. Nos. 1,591,572 (Stimson), 4,588,258 (Hoopman), 4,775,219 (Appledorn et al.), 5,138,488 (Szczech), and 5,557,836 (Smith et al.). It is known to apply a seal layer to the structured surface in a regular pattern of closed polygons which form isolated, sealed cells to keep contaminants away from individual cube corners. Heat and pressure used to form the cells destroys or deforms cube corner elements located along the polygon boundaries.

Flexible cube corner sheetings such as those disclosed in U.S. Pat. No. 5,450,235 (Smith et al.), and retroreflective dichroic sheetings disclosed in U.S. Pat. No. 6,157,486, and numerous other types of retroreflective sheetings are also known and can be incorporated in embodiments described herein. It may be appreciated that other retroreflective sheetings and devices may also be incorporated in embodiments of the present invention, which is not limited to those retroreflective examples shown herein.

Figure 2:
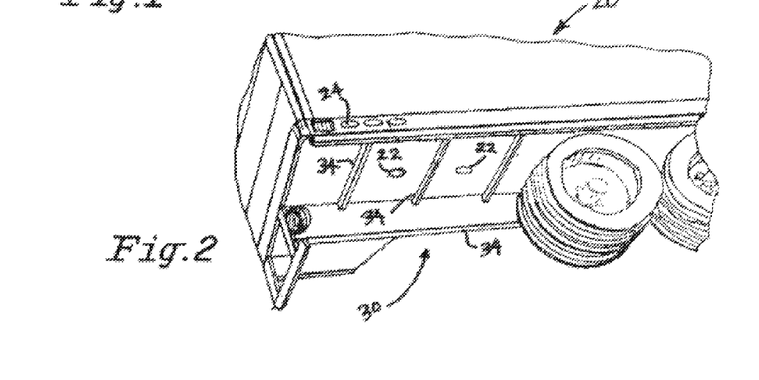
FIG. 2 is a partial bottom perspective view of the vehicle of FIG. 1.

As shown in FIG. 2, at least one retroreflector 22 is preferably affixed to the underside 30 of vehicle 20. It may be appreciated that a retroreflector 22 may also be affixed to an extension piece (not shown) (i.e., a piece extending from the vehicle) or even affixed to or projecting from the side portion of vehicle 20 such that retroreflector 22 is nonetheless oriented to face away from underside 30 and toward roadway 32. It may also be appreciated that retroreflector 22 may comprise a sheet, paint, paste or other retroreflective material affixed to vehicle 20 at or along various structural members 34. In the case of retroreflective paint, the use of a generally planar exterior surface is not always employed such as is generally shown in U.S. Pat. No. 5,897,914, among perhaps others. The disclosures including the background description presented in U.S. Pat. No. 5,897,914, is incorporated herein by reference, and provides some examples of paint having reflective particles potentially useful for the present invention. Preferably multiple retroreflectors 22 are affixed to vehicle 20 to increase the possibility of presenting a reflected image to an oncoming vehicle. Also, multiple retroreflectors 22 are preferred since an underside positioning may tend to dirty the retroreflectors 22 which otherwise decreases optical performance. Preferably retroreflector 22 is mounted to a rigid part of vehicle 20. A combination of different types of retroreflectors 22 may also be used.

Figure 6:
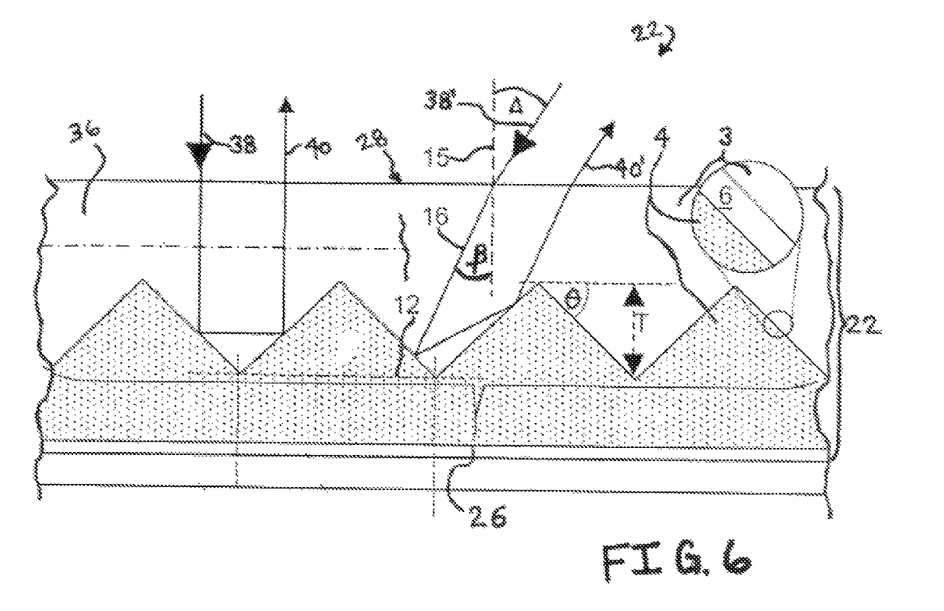
FIG. 6 is a section view of one aspect of the present invention.
Figure 7:
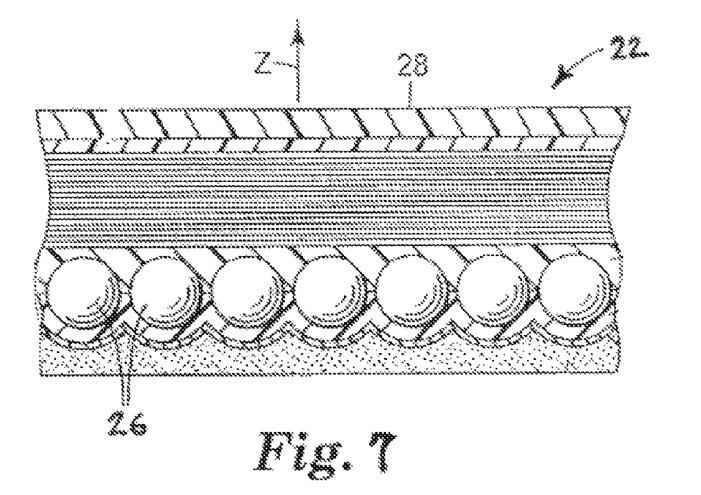
FIG. 7 is a section view of a further aspect of the present invention.
Figure 8:
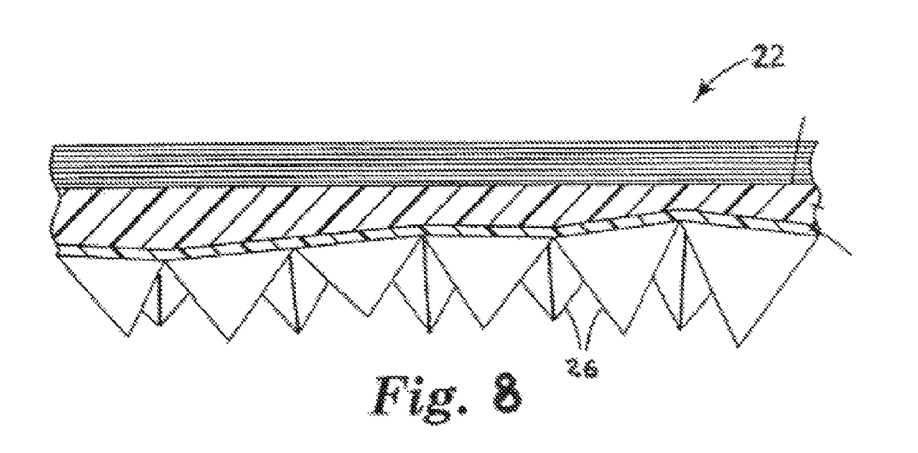
FIG. 8 is a section view of a further aspect of the present invention.

As shown in FIG. 6, an exemplary sheeting retroreflector 22 is shown in cross section. Retroreflector 22 includes retroreflective elements 26 covered by a layer of film 36 or other transparent material and having an exterior surface 28. Surface 28 is preferably a smooth, flat, transparent exterior film with retroreflective elements 26 embedded beneath. Light as indicated at 38 and 38' which is incident through the surface 28 is reflected in the layer composite 22 at the reflection layer 6. Because of the angle of inclination delta of 45 degree, reflected light beams indicated at 40, 40' leave the layer composite 22 again only after double reflection in parallel relationship with the direction of the incident light 38, 38'. That applies in regard to a wide range of values of an angle of incidence delta which is measured between the direction of the incident light 38, 38' and a normal 15 on to the free surface 28 of the layer composite 22. The values for the angle of incidence delta are in a range of between zero degree and about 75 degree and thus embrace practically the entire half-space over the layer composite 22. As the transparent plastic materials of the structure layer 3 usually involve a refractive index of about n=1.5, the incident light beams 38' are deflected towards the normal 15 as refracted light beams 16, because of the refraction effect. Within the layer composite 22 the effective angle of incidence beta between the refracted light beams 16 and the normal 15 is at most 45 degree. As the incident light 38, 38', irrespective of the angle of incidence delta, is always reflected in the direction from which the incident light 38, 38' comes, corresponding layer composites 22 are known by the term retroreflector. Further exemplary reflective sheeting is shown with reference to FIG. 7 and FIG. 8. It may be appreciated that numerous types and varieties of retroreflective sheeting or retroreflectors may be used in the invention, which is not limited to those retroreflectors or retroreflective elements shown herein.

Preferably retroreflector 22 complies with ASTM D4956 standards, as well as conspicuity marking requirements. Although applicant is aware of no present conspicuity marking requirements pertaining to the use of retroreflective or reflex reflectors on the underside or topside of vehicles, applicant submits that there should be. Such requirements, and the invention, would preferably meet the requirements of 49 C.F.R. Section 571.108 as may be modified to accommodate the conspicuity marking on the underside or for the purpose of making the underside of a vehicle more conspicuous. A preferred retroreflector 22 would produce, at an observation angle of 0.2 degree with respect to the generally flat exterior surface of the retroreflector, not less than 300 milicandelas/lux at any light entrance angle between 30 degrees left and 30 degrees right, including an entrance angle of zero degree, and not less than 75 millicandelas/lux at any light entrance angle between 45 degrees left and 45 degrees right. It may be appreciated that such left and right degree measures of illumination may also apply to illuminations measured in the relative up and down dimensions of the retroreflector. It is further preferred that retroreflector would include means for producing 22, at an observation angle of 0.2 degree with respect to a substantially planar exterior surface of retroreflector, not less than 100 milicandelas/lux at any light entrance angle between 30 degrees left and 30 degrees right, including an entrance angle of zero degree, and not less than 25 millicandelas/lux at any light entrance angle between 45 degrees left and 45 degrees right. Preferably the illumination is greater. Preferably retroreflector 22 complies with all present and future Standards of the Society of Automotive Engineers, including ASTM D4956. Preferably, retroreflector also complies with 49 C.F.R. Section 571.108, and S5.7.2 (b) or comparable regulations and standards which have been or may be adopted pertaining to underside conspicuity. By comparison, it is expected that the minimum retroreflectivity of highway marking paint is, or will soon be, mandated to be at least 150 mcd/m$^2$/lx, (150 millicandela per square meter per lux of illumination).

Figure 9:
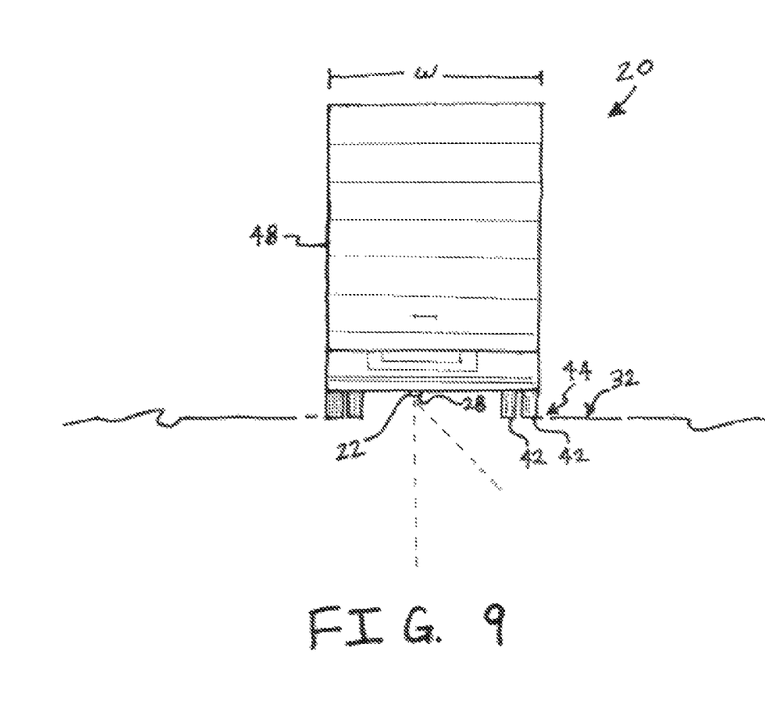
FIG. 9 is a rear view of a further aspect of the present invention.
Figure 10:
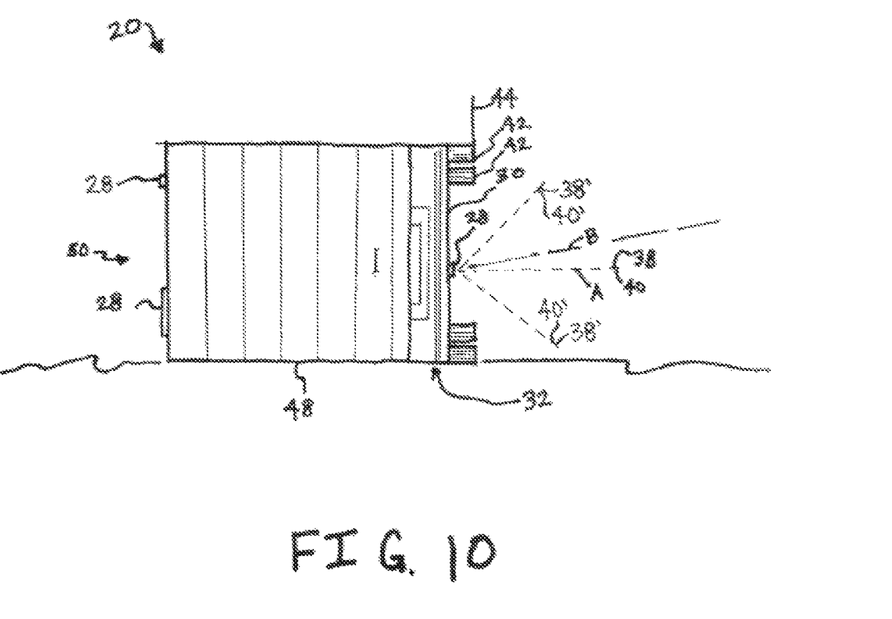
FIG. 10 is a rear view of further aspect of the present invention shown in FIG. 9.

Referring to FIG. 9 and FIG. 10, vehicle 20 includes at least two wheels 42. Wheels 42 define a bottom plane 44 where the wheels 44 contact the roadway 32. It may be appreciated that bottom plane 44 may extend vertically upward and downward from the page in the drawings of FIG. 9. and FIG. 10. It may also be appreciated that bottom plane 44 may be defined by a set of at least three, four or more wheels 42 where wheels 42 contact with the roadway 32. It may further be appreciated that bottom plane 44 may lie parallel or substantially parallel with a plane formed by the underside 30 of vehicle 20. Preferably, vehicle 20 includes at least one retroreflector 22 affixed to vehicle 20 with at least a portion of retroreflector 22 having a substantially planar, substantially transparent exterior surface 28. The substantially planar exterior surface 28 is preferably aligned substantially parallel to bottom plane 44. Preferably, retroreflector 22 is mounted to the underside 30 of vehicle 20.

It may be appreciated that retroreflector 22 may be mounted to underside 30 of vehicle 20 anywhere along a width "w" of vehicle as shown in FIG. 9. Preferably at least one retroreflector 22 is designed, and mounted, such that an oncoming vehicle's headlights will cast light 38 which is retroreflected as light 40 with minimal loss of intensity. As shown in FIG. 10, the light 38 represented by the relatively horizontal dashed line "A" may originate from the headlights of an oncoming vehicle, in which case the light A may be retroreflected with greatest intensity from surface 28. An observer in an approaching vehicle (not shown) may have, for instance an observation line generally shown by broken line B, thus forming an observation angle BA. Retroreflector 22 is preferably mounted approximately at a middle portion of the width W of underside 30. The preferred placement upon the width W of vehicle 20 would depend upon the width of the particular vehicle. Preferably multiple retroreflectors 22 would be affixed to vehicle 30, including retroreflectors of the sheeting variety, among others. Preferably two sheets of reflective material 22 may be configured in a generally crossing pattern running from side-to-side (or portion thereof) and front-to-back (or portion thereof) to improve the conspicuity of underside 30 of vehicle 20.

Figure 11:
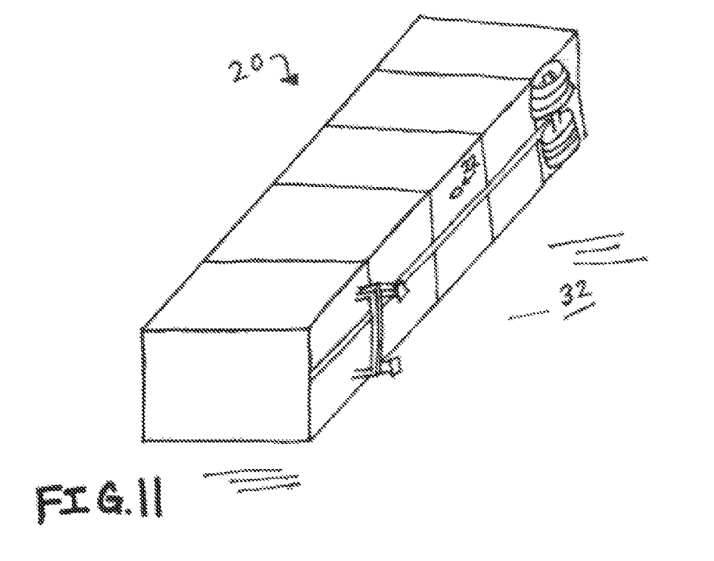
FIG. 11 is a perspective view of a further aspect of the present invention.
Figure 12:
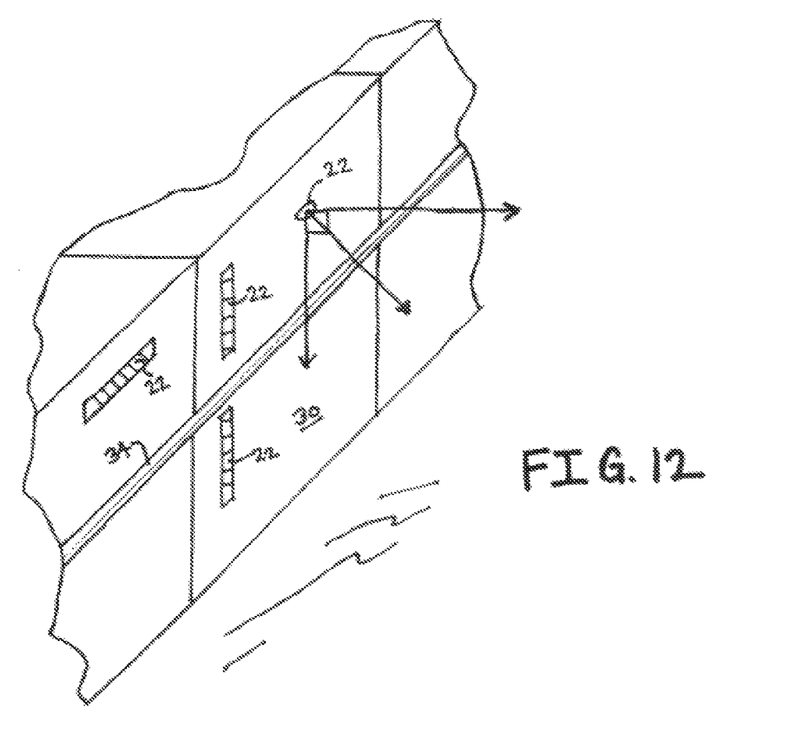
FIG. 12 is a partial perspective view of the invention of FIG. 11.

As shown in FIG. 9 and FIG. 10 vehicle 20 includes side 48. In this aspect of the invention retroreflector 22 has a substantially planar, transparent exterior surface 28 aligned substantially perpendicular to the roadway 32 when vehicle 20 lies on side 48. It may be appreciated that underside 30 is a generally planar surface and oriented generally parallel to roadway 32 above which vehicle 20 travels. It may be appreciated that at least one retroreflector 22 may be affixed to a top portion 50 of vehicle 20. FIG. 11 and FIG. 12 show further aspects of the present invention where vehicle 20 is tipped on a side 48.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise specifically indicated.

What is claimed is:

1. A vehicle for travel on a roadway comprising:
    a vehicle; and
    at least one retroreflector affixed to said vehicle, at least a portion of said retroreflector having a substantially planar, substantially transparent exterior surface, said substantially planar, substantially transparent exterior surface aligned substantially parallel to the roadway.

2. The vehicle of claim 1 wherein said exterior surface is positioned opposite retroreflective elements contained within said retroreflector.

3. The vehicle according to claim 1 wherein said retroreflector is one selected from the group comprising a retroreflector, a corner cube reflector, a cube corner element, a cat's-eye reflector, a retroreflective tape, a retroreflective strip, a retroreflective sheeting, microsphere-based sheeting, cube corner sheeting, a microsphere bead, a retroreflective paint, a retroreflective paste, a retroreflective glass bead, a retroreflective ceramic bead, and a molded plastic retroreflector.

4. The vehicle of claim 1 wherein said at least one retroreflector is mounted to a rigid part of said vehicle.

5. The vehicle of claim 1 wherein said at least one retroreflector is mounted to an underside of said vehicle.

6. The vehicle according to claim 1 wherein said retroreflector is capable of producing, at an observation angle of 0.2 degree with respect to said surface, not less than 100 milicandelas/lux at any light entrance angle between 30 degrees left and 30 degrees right, including an entrance angle of zero degree, and not less than 25 millicandelas/lux at any light entrance angle between 45 degrees left and 45 degrees right.

7. The vehicle of claim 1 wherein said vehicle has at least four wheels and wherein said retroreflector complies with a standard set by the Society of Automotive Engineers.

8. A vehicle for travel on a roadway comprising:
    a vehicle having at least two wheels defining a bottom plane where said wheels contact the roadway; and
    at least one retroreflector affixed to said vehicle, at least a portion of said retroreflector having a substantially planar, substantially transparent exterior surface, said substantially planar, substantially transparent exterior surface aligned substantially parallel to said bottom plane.

9. The vehicle according to claim 8 wherein said retroreflective is one selected from the group comprising a retroreflector, a corner cube reflector, a cube corner element, a cat's-eye reflector, a retroreflective tape, a retroreflective strip, a retroreflective sheeting, microsphere-based sheeting, cube corner sheeting, a microsphere bead, a retroreflective paint, a retroreflective paste, a retroreflective glass bead, a retroreflective ceramic bead, and a molded plastic retroreflector.

10. The vehicle of claim 8 wherein said retroreflective is mounted to an underside of said vehicle.

11. The vehicle according to claim 8 wherein said retroreflector is capable of producing, at an observation angle of 0.2 degree with respect to said surface, not less than 100 milicandelas/lux at any light entrance angle between 30 degrees left and 30 degrees right, including an entrance angle of zero degree, and not less than 25 millicandelas/lux at any light entrance angle between 45 degrees left and 45 degrees right.

12. A vehicle for travel on a roadway comprising:
    a vehicle having a side; and
    at least one retroreflector affixed to said vehicle, at least a portion of said retroreflector having a substantially planar, transparent exterior surface, said substantially planar, transparent exterior surface aligned substantially perpendicular to the roadway when said vehicle lies on said side.

13. The vehicle of claim 12 wherein said substantially planar exterior surface is aligned substantially parallel to the roadway when said vehicle is in an upright position.

14. The vehicle of claim 12 where said retroreflector is capable of producing, at an observation angle of 0.2 degree with respect to said surface, not less than 300 milicandelas/lux at any light entrance angle between 30 degrees left and 30 degrees right, including an entrance angle of zero degree, and not less than 75 millicandelas/lux at any light entrance angle between 45 degrees left and 45 degrees right.

15. A method for enhancing the visibility of a vehicle, said method comprising:
    providing a vehicle;
    affixing at least one retroreflector having retroreflective elements to the vehicle; and
    orienting said retroreflector to reflect incident light away from said vehicle at an angle generally perpendicular to an underside of the vehicle, and
    where said affixing step aligns the retroreflective elements substantially parallel to the underside of the vehicle.

16. The method of claim 15 wherein said retroreflector is one selected from the group comprising a retroreflector, a corner cube reflector, a cube corner element, a cat's-eye reflector, a retroreflective tape, a retroreflective strip, a retroreflective sheeting, microsphere-based sheeting, cube corner sheeting, a microsphere bead, a retroreflective paint, a retroreflective paste, a retroreflective glass bead, a retroreflective ceramic bead, and a molded plastic retroreflector.

17. The method of claim 15 wherein said affixing a retroreflector to said vehicle includes mounting said retroreflector to at least one from the group comprising a rigid topside portion of said vehicle and a rigid underside portion of said vehicle.

18. The method of claim 15 wherein said retroreflector provides, at an observation angle of 0.2 degree, not less than 300 milicandelas/lux at any light entrance angle between 30 degrees left and 30 degrees right, including an entrance angle of zero degree, and not less than 75 millicandelas/lux at any light entrance angle between 45 degrees left and 45 degrees right.

19. The method of claim 18 wherein said observation angle is perpendicular to said underside.

20. A vehicle for traveling on a roadway made in accordance with the method of claim 15.

* * * * *